(12) United States Patent
Wang et al.

(10) Patent No.: US 10,751,916 B2
(45) Date of Patent: Aug. 25, 2020

(54) GAS-ASSISTED RUBBER WET MIXING PREPARATION APPARATUS

(71) Applicant: Qingdao University Of Science And Technology, Shandong (CN)

(72) Inventors: Chuansheng Wang, Shandong (CN); Hao Wu, Shandong (CN); Mingsheng Wu, Shandong (CN); Jie Liu, Shandong (CN); Huiguang Bian, Shandong (CN)

(73) Assignee: Qingdao University Of Science And Technology, Shandong (CN)

( * ) Notice: Subject to any disclaimer, the term of this patent is extended or adjusted under 35 U.S.C. 154(b) by 54 days.

(21) Appl. No.: 16/132,501

(22) Filed: Sep. 17, 2018

(65) Prior Publication Data
US 2019/0030756 A1    Jan. 31, 2019

Related U.S. Application Data

(63) Continuation of application No. PCT/CN2017/076413, filed on Mar. 13, 2017.

(30) Foreign Application Priority Data

Mar. 17, 2016    (CN) .......................... 2016 1 0151951

(51) Int. Cl.
*B29B 7/74*    (2006.01)
*B29B 7/76*    (2006.01)
(Continued)

(52) U.S. Cl.
CPC .............. *B29B 7/7495* (2013.01); *B29B 7/76* (2013.01); *B29B 15/00* (2013.01); *B29B 15/04* (2013.01)

(58) Field of Classification Search
CPC .......... B29B 7/7496; B29B 7/76; B29B 15/04
See application file for complete search history.

(56) References Cited

U.S. PATENT DOCUMENTS

| | | | | |
|---|---|---|---|---|
| 4,480,925 A | * | 11/1984 | Dietrich | ................ B01F 5/0062 366/107 |
| 4,496,076 A | * | 1/1985 | Tompkins | ............ B65D 88/703 222/195 |

(Continued)

FOREIGN PATENT DOCUMENTS

| | | |
|---|---|---|
| CN | 1616529 | 5/2005 |
| CN | 102630238 | 8/2012 |

(Continued)

OTHER PUBLICATIONS

"Office Action of China Counterpart Application," dated Oct. 10, 2017, pp. 1-6.

(Continued)

*Primary Examiner* — Elizabeth Insler
(74) *Attorney, Agent, or Firm* — JCIPRNET

(57) ABSTRACT

A gas-assisted rubber wet mixing preparation apparatus is disclosed, including a rack, a reactor is fixedly mounted below the rack; a mixing chamber in an ellipsoidal shape is provided inside the reactor; the reactor is provided with a plurality of feed ports, the feed ports are provided at an included angle with respect to the horizontal plane; spray guns cooperating with the feed ports are fixedly mounted on an outer wall of the reactor, a material storage tank and a gas supply device are connected to the spray gun; the spray guns and the material storage tanks are in one-to-one correspondence, and the spray guns are connected to the corresponding material storage tanks respectively; a discharge port is further provided below the reactor, and a receiver tray is provided below the discharge port.

8 Claims, 3 Drawing Sheets

(51) Int. Cl.
    *B29B 15/04*         (2006.01)
    *B29B 15/00*         (2006.01)

(56) References Cited

U.S. PATENT DOCUMENTS

| | | | |
|---|---|---|---|
| 5,769,536 A * | 6/1998 | Kotylak | B01F 1/0022 366/136 |
| 7,850,105 B2 * | 12/2010 | Ito | B02C 19/061 241/39 |

FOREIGN PATENT DOCUMENTS

| | | |
|---|---|---|
| CN | 102958590 | 3/2013 |
| CN | 103113597 | 5/2013 |
| CN | 104212108 | 12/2014 |
| CN | 105729654 | 7/2016 |
| WO | 2015018278 | 2/2015 |

OTHER PUBLICATIONS

"Office Action of China Counterpart Application," dated Apr. 19, 2018, pp. 1-7.

Agricultural Machinery Management Station of Shaanxi Province. "Tractor," Dec. 31, 1979, Shaanxi Science and Technology Press, pp. 74, with English translation thereof.

Li; Yuan-Jun. "Automotive Coating Technology," Jul. 31, 2015, Beijing Institute of Technology Press LLC, pp. 58, with English translation thereof.

Lin; Yu-Lian. "Method for Producing Refractory Materials and Clean Steel," Apr. 30, 2012, Metallurgical Industry Press, pp. 191, with English translation thereof.

\* cited by examiner

US 10,751,916 B2

GAS-ASSISTED RUBBER WET MIXING PREPARATION APPARATUS

CROSS-REFERENCE TO RELATED APPLICATION

This application is a continuation of international PCT application serial no. PCT/CN2017/076413, filed on Mar. 13, 2017, which claims the priority benefit of China application no. 201610151951.8, filed on Mar. 17, 2016. The entirety of each of the above-mentioned patent applications is hereby incorporated by reference herein and made a part of this specification.

TECHNICAL FIELD

The present invention relates to the technical field of rubber mixing, in particular to a gas-assisted rubber wet mixing preparation apparatus.

BACKGROUND

The raw materials used in the rubber industry have always been blocky rubber for a long time, the blocky rubber not only brings inconvenience to carrying and batching, but also needs to be cut into small blocks to be weighed, and meanwhile, during mixing, great power will be consumed in order to comminute and mix the blocky rubber, and therefore, heavy-duty rubber mixing equipment is needed, not only is the power consumed greatly, but also the carbon black is not easy to disperse, rubber mixing takes more times and longer period. Besides, latex produced by the rubber tree is liquid, in order to prepare blocky rubber, latex should be solidified and dried. The procedure is very burdensome, the period is long, moreover, lots of manpower and material resources are consumed, and thus a lot of energy sources are wasted.

Aiming at various disadvantages during mixing of blocky rubber, wet mixing technology is developed. The wet mixing technology is a method to produce rubber compound by preparing fillers such as pre-processed carbon black and silica into aqueous dispersion, sufficiently mixing with rubber latex in a liquid state, and then performing processes such as coagulation, dewatering, and drying. Totally different from conventional multi-stage dry mixing of dry rubber and compounding ingredients such as carbon black and silica in an internal mixer, the wet mixing technology has the maximum advantages of good dispersion of fillers and good physical mechanical properties of vulcanized rubber, so that floating pollution of powder fillers can be effectively avoided, which is environmentally friendly; the mixing effect with other compounding materials is good, processing is very convenient, the mixing energy consumption and cost of the rubber can be remarkably reduced, facilitating to realize continuous mixing process.

Method and apparatus for preparing latex coagulum composites are disclosed in a Chinese patent application with application No. 201080052075.4, comprising a coagulum reactor having a mixing portion and a generally tubular diffuser portion extending with progressively increasing cross-sectional area from an entry end to an open discharge end. The apparatus is further characterized by a delivery tube terminating in an injection orifice adapted and constructed to deliver a fluid to the diffuser portion at a portal disposed between the entry end and the open discharge end. The application of the apparatus in preparation of latex composites mainly utilizes change in diameter of the conduit generates a mixing effect.

A continuous manufacturing method of rubber masterbatch is disclosed in a Chinese patent application with application No. 201310037190. X, the specific technical solutions are that: coagulator is a tubular coagulator having one or two or more inlets. When a mixture of rubber/filler/additive/solvent after refined dispersion is injected into the coagulator under the conditions of high speed and high turbulence, as the speed is very high, according to the principle of fluid mechanics and fluid mechanics of turbulence, the internal pressure of the mixture gets down sharply. Under the effect of high shear, the mixture will form tiny droplets. The rubber mixing utilizes the shape of the apparatus, and the liquid forms high speed and high turbulence within the apparatus for mixing.

The above two mixing effects are not ideal. No effective solution has been provided at present aiming at the problems in the related art.

SUMMARY

It is an object of the present invention to provide a gas-assisted rubber wet mixing preparation apparatus, aiming at overcoming the above disadvantages in the prior art.

The objects of the present invention are achieved by the following technical solutions:

A gas-assisted rubber wet mixing preparation apparatus, including a rack, a reactor is fixedly mounted below the rack; a mixing chamber in an ellipsoidal shape is provided inside the reactor; the reactor is provided with a plurality of feed ports, the feed ports are provided at an included angle with respect to the horizontal plane; spray guns cooperating with the feed ports are fixedly mounted on an outer wall of the reactor, a material storage tank and a gas supply device are connected to the spray gun; the number of the spray guns and the number of the material storage tanks are in one-to-one correspondence, and the spray gun and the material storage tank are connected independently; a discharge port is further provided below the reactor, and a receiver tray is provided below the discharge port.

Further, a first flange is provided on the top of the rack, the first flange is fixedly connected to the reactor.

Further, the reactor is fixedly provided with a plurality of second flanges at positions of the feed ports, the second flange and a third flange provided on the spray gun are connected cooperatively.

Preferably, the opening direction of the feed port forms an included angle ranging from 30° to 60° with the horizontal plane.

Further, a material guide pipe is provided between the material storage tank and the spray gun.

Further, a gas guide pipe is provided between the gas supply device and the spray gun.

Further, the spray gun is further provided with a material regulating valve, a sector regulating valve and a solenoid valve.

Further, the spray gun is regulated at an angle ranging from 60° to 120° by the sector regulating valve.

It is another object of the present invention to provide a rubber wet mixing preparation method using the gas-assisted rubber wet mixing preparation apparatus described above, the method includes the following steps:

S1: each material in the formulation is prepared into separate homogeneous aqueous dispersion solution;

S2: various aqueous dispersion solutions obtained in step S1 are loaded into different material storage tanks, respectively;

S3: the solution in the material storage tank is sprayed out of the corresponding spray gun under pressure, so as to ensure that the solution sprayed out of the spray gun is uniformly atomized and continuously sprayed to the mixing chamber of the reactor;

S4: all the atomized materials are diffused and contacted in the mixing chamber, coagulated on the inner wall of the mixing chamber after mixing, and discharged along the inner wall of the mixing chamber, to obtain a rubber mixture; and S5: the rubber mixture obtained in Step S4 is flocculated, washed and dewatered, to obtain a rubber master batch.

The prevent invention has the beneficial effects as follows: various raw materials in the formulation are prepared into a solution state, the solution is atomized uniformly by the spray gun, and diffusively mixed in the mixing chamber, thus achieving a wet mixing effect; the specific surface area for material contact is improved by the atomization, thereby improving the wet mixing effect; the apparatus of the present invention has advantages of simple structure, convenient installation, low equipment investment, little space taking, simple and convenient operation, low energy consumption, and continuous production. Meanwhile, the rubber wet mixing preparation method provided in the present invention has advantages that, the working environment is improved, the environmental pollution is reduced, the energy is saved, the processing technology is simple, and industrial production can be realized.

BRIEF DESCRIPTION OF THE DRAWINGS

To make the technical solutions of the present invention or the prior art more clearly, the following provides the accompanying drawings used in description of the embodiments of the present invention. Apparently, the accompanying drawings show certain embodiments of the invention, which are illustrative rather than exhaustive, and persons skilled in the art can derive other drawings from them without creative efforts.

Figure 1:
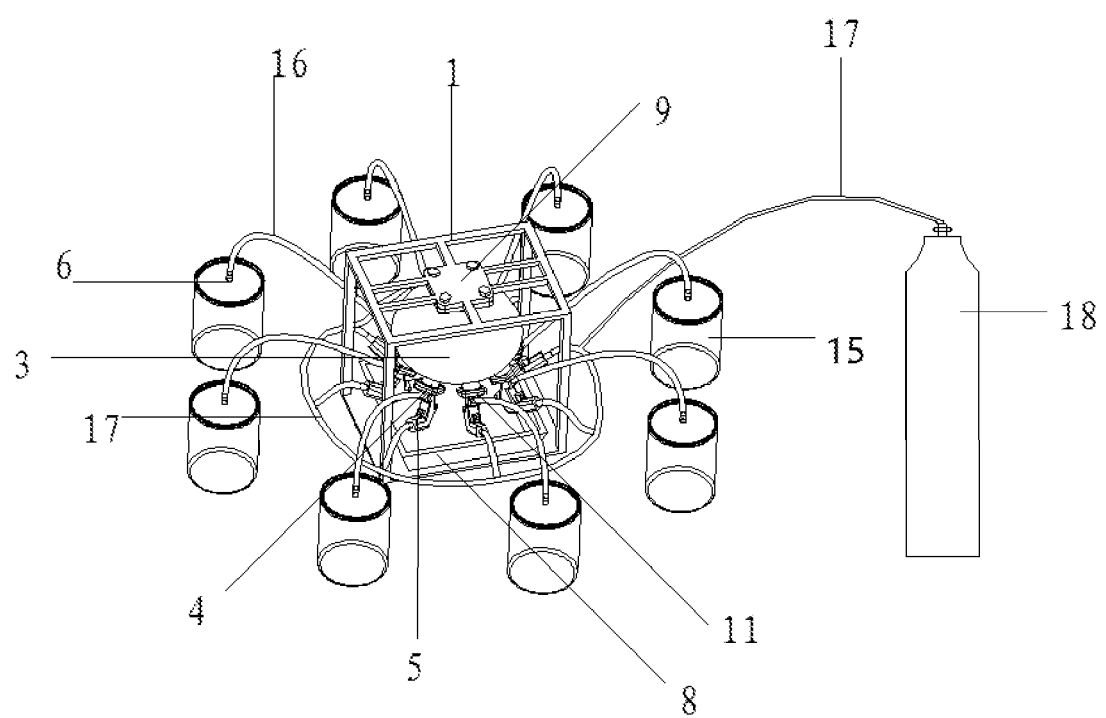
FIG. 1 illustrates a gas-assisted rubber wet mixing preparation apparatus according to an embodiment of the present invention.
Figure 2:
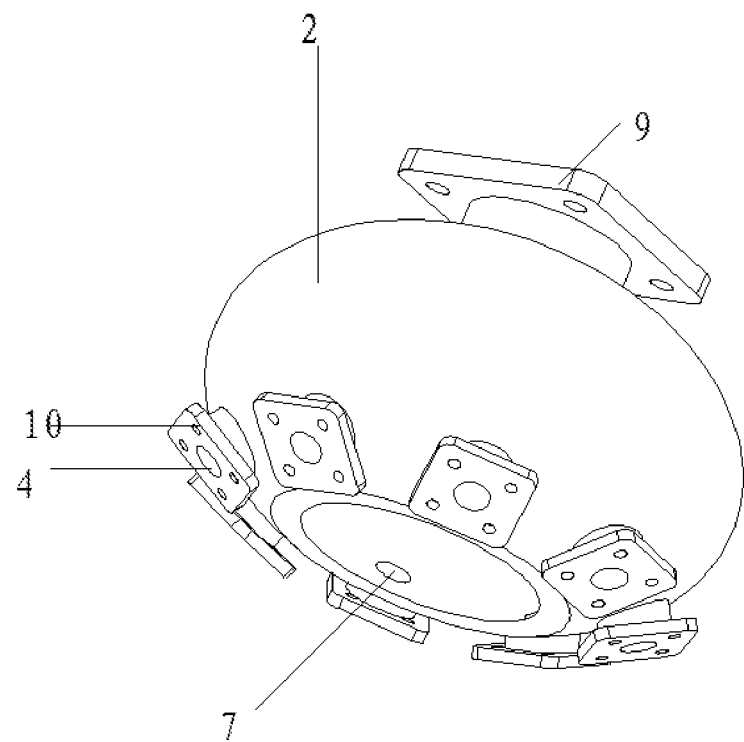
FIG. 2 is a schematic structural diagram of a reactor according to an embodiment of the present invention.
Figure 3:
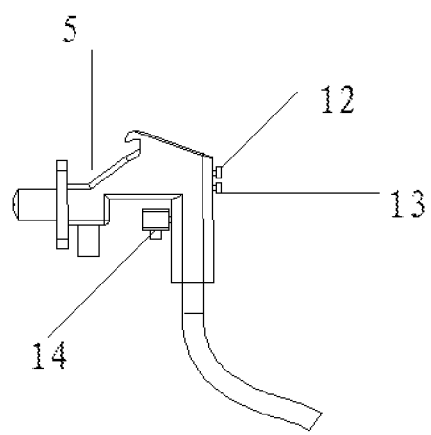
FIG. 3 is a schematic structural diagram of a spray gun according to an embodiment of the present invention.
Figure 4:
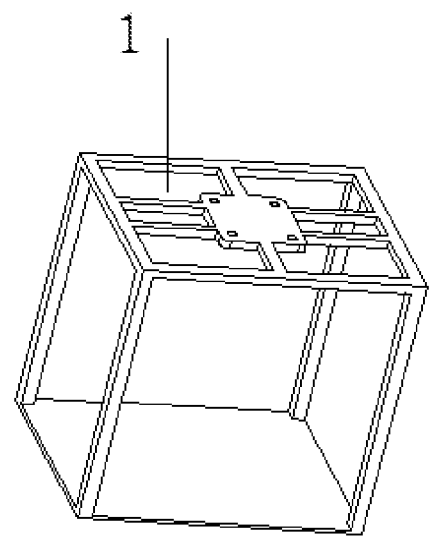
FIG. 4 is a schematic structural diagram of a rack according to an embodiment of the present invention.

REFERENCE NUMERALS 1, rack; 2, reactor; 3, mixing chamber; 4, feed port; 5, spray gun; 6, gas supply device; 7, discharge port; 8, receiver tray; 9, first flange; 10, second flange; 11, third flange; 12, material regulating valve; 13, sector regulating valve; 14, solenoid valve; 15, material storage tank; 16, material guide pipe; 17, gas guide pipe; 18, gasholder.

DETAILED DESCRIPTION OF THE EMBODIMENTS

The technical solutions in the embodiments of the present invention are hereinafter described clearly and completely with reference to the accompanying drawings in the embodiments of the present invention. Obviously, the embodiments described here are part of the embodiments of the invention and not all of the embodiments. Based on the embodiments of the invention, other embodiments obtained by persons skilled in the art are within the scope protected by the present invention.

As shown in FIG. 1 to FIG. 4, a gas-assisted rubber wet mixing preparation apparatus according to an embodiment of the present invention includes a rack 1, a first flange 9 is provided on the top of the rack, the first flange 9 is fixedly connected to the reactor 2, a mixing chamber 3 in an ellipsoidal shape is provided inside the reactor 2; the reactor 2 is provided with a plurality of feed ports 4, the feed ports 4 are provided at an angle of 60° with respect to the horizontal plane; spray guns 5 are fixedly mounted on an outer wall of the reactor 2. The reactor is fixedly provided with a plurality of second flanges 10 at positions of the feed ports 4, the second flange 10 and a third flange 11 provided on the spray gun 5 are connected cooperatively. The spray gun 5 is connected to a material storage tank 15 via a material guide pipe 16, and the spray gun 5 is connected to a gas supply device 6 via a gas guide pipe. The number of the spray guns 5 and the number of the material storage tanks 15 are in one-to-one correspondence, and the spray gun and the material storage tank are connected independently; a discharge port 7 is further provided below the reactor 2, and a receiver tray 8 is provided below the discharge port 7.

Again referring to FIG. 3, the spray gun is further provided with a material regulating valve 12, a sector regulating valve 13 and a solenoid valve 14. Preferably, the spray gun 5 is regulated at an angle ranging from 60° to 120° by the sector regulating valve 13.

In practical use, the gas-assisted rubber wet mixing preparation apparatus of the present invention includes a rack 1, a mixing chamber 3, a spray gun 5, a receiver tray 8, a material storage tank 15, and a gas supply device 6 consisting of a gasholder 18 and a gas guide pipe 17.

The rack 1 is fixed to the ground, the mixing chamber 3 is fixedly connected to the rack 1 by bolts via the first flange 9, the mixing chamber 3 is an ellipsoidal housing and provided with a plurality of second flanges 10, a discharge port 7 is provided on a corresponding second flange 10, eight feed ports 4 (the actual number of holes can be determined according to types of rubber compounding ingredients) are uniformly formed along the circumference direction at a height of ¼ ellipsoid above the discharge port 7, for being equipped with eight spray guns 5 (the number of the spray guns is the same with the number of the discharge ports on the mixing chamber), the feed ports 4 are provided at an angle of 60° with respect to the horizontal plane. The eight spray guns 5 are welded with third flanges 11, respectively (the number of the third flanges 11 corresponds to the number of holes on the mixing chamber 3). The eight spray guns 5 are fixedly connected to the second flanges 10 on the mixing chamber 3, respectively via eight third flanges 11. The spray gun 5 is provided with a solenoid valve 14 for controlling opening and closing of the spray gun 5, and further provided with a sector regulating valve 13 and a material regulating valve 12, for controlling spraying range and material feeding flow respectively. The spray gun nozzle is 1.0 to 3.0 mm in diameter and adjustable in size, and is preferably 2.0 mm.

In an embodiment, rubber wet mixing formulation is set forth in Table 1 below.

TABLE 1

| Name | Parts |
| --- | --- |
| Natural Rubber | 100 |
| ZnO | 2 |
| Stearic acid | 2 |
| High dispersible silica | 60 |
| Si69 | 10 |
| Antioxidant 4020 | 2 |
| Accelerator D | 1.3 |
| Accelerator CZ | 1.2 |
| Sulphur | 1 |

A rubber wet mixing preparation method using the gas-assisted rubber wet mixing preparation apparatus described above is disclosed, including the following steps:

Step one: fillers and compounding ingredients in the formulation are prepared into corresponding solutions, and the solutions are formulated into homogeneous aqueous dispersion.

Preparation of the above solutions particularly include:

1. Preparation of a natural latex solution: 332 g of a centrifugally-concentrated natural latex with a dry rubber content of 60% is taken, 668 g of distilled water is added into the latex, and after stirring with a stirring rod, the centrifugally-concentrated natural latex is diluted into a natural latex solution with a dry rubber content of 20%.

2. Preparation of silica slurry: 120 g of high dispersible silica is taken and dissolved in 480 g of distilled water, the silica is completely dissolved in distilled water after stirring with a glass rod. The well-mixed silica slurry is treated with a T25 high-speed dispersion machine at 12000 rpm for 1 minute, and then the silica slurry is ground for 2 hours in a planetary ball mill.

3. Preparation of silane coupling agent solution: 20 g of silane coupling agent Si69 is taken and dissolved into 180 g of distilled water, after uniformly stirring with a glass rod, the Si69 solution is ground for 30 minutes in a planetary ball mill.

4. Preparation of ZnO solution: 4 g of ZnO is taken and dissolved into 76 g of distilled water, after uniformly stirring with a glass rod, the ZnO solution is ground for 30 minutes in a planetary ball mill.

5. Preparation of stearic acid solution: 4 g of stearic acid SAD is taken and dissolved into 76 g of distilled water, after uniformly stirring with a glass rod, the stearic acid solution is ground for 30 minutes in a planetary ball mill.

6. Preparation of antioxidant 4020 solution: first, particles of antioxidant 4020 are ground for 1 hour in a planetary ball mill, the antioxidant 4020 after grinding is in powder form, 4 g of the antioxidant 4020 is taken and dissolved into 76 g of distilled water, after uniformly stirring with a glass rod, the antioxidant 4020 solution is ground for 30 minutes in the planetary ball mill.

7. Preparation of accelerator D solution: 2.6 g of accelerator D is taken and dissolved into 49.4 g of distilled water, after uniformly stirring with a glass rod, the accelerator D solution is ground for 30 minutes in a planetary ball mill.

8. Preparation of vulcanizing system solution: 2.4 g of accelerator CZ and 2 g of Sulphur are taken and dissolved into 83.6 g of distilled water, after uniformly stirring with a glass rod, the vulcanizing system solution is ground for 30 minutes in a planetary ball mill.

Step two: aqueous dispersions of various raw materials obtained above are loaded into corresponding material storage tanks, respectively.

In particular, fillers such as carbon black and silica, various compounding ingredients and vulcanizing system are made into aqueous dispersion, the aqueous dispersion of latex, filler slurry, various compounding ingredients and vulcanizing system are put into eight material storage tanks 15, respectively, the material storage tank 15 is connected to the spray gun 5 via a material guide pipe 16, each material storage tank 15 is correspondingly connected to a spray gun 5, and the material storage tank 15 supplies materials for the spray gun 5.

Step three: the solution in the material storage tank is sprayed out of the corresponding spray gun under pressure, so as to ensure that the solution sprayed out of the spray gun is uniformly atomized and continuously sprayed to the mixing chamber of the reactor.

The gas supply device 6 is connected to the spray gun 5 via a gas guide pipe 17, the gasholder 18 supplies gas for the spray gun, the gas pressure is 0.5 to 3 MPa and adjustable in size, and is preferably 2 MPa. A receiver tray 8 is provided below the chamber 3, for holding the mixture solution after reaction.

Specifically, during spraying, the solution including a latex solution, a filler slurry solution, solutions of various compounding ingredients and vulcanizing systems sprayed out of the spray gun under a pressure of 3 MPa is uniformly atomized, and each of the spray guns 5 sprays towards the top of the mixing chamber 3 at an included angle of 60° with respect to the horizontal plane, and the uniformly atomized latex solution, the filler slurry solution, solutions of various compounding ingredients and vulcanizing systems can be sufficiently contacted, achieving a good dispersively mixed state.

Figure 5:
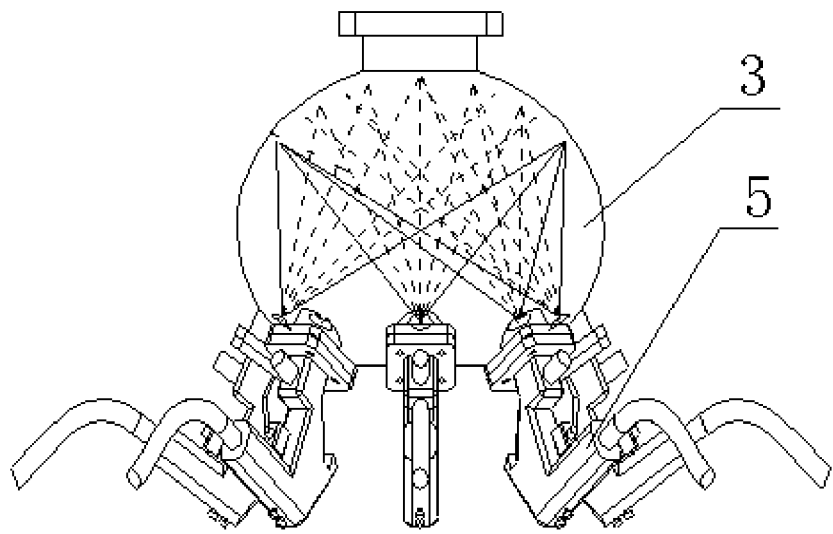
FIG. 5 is a working schematic diagram of a spray gun spraying in a mixing chamber according to an embodiment of the invention.

Step four: as shown in FIG. 5, all the atomized materials are diffused and contacted in the mixing chamber, coagulated on the inner wall of the mixing chamber after mixing, and discharged along the inner wall of the mixing chamber, to obtain a rubber mixture.

In particular, the mixing chamber 3 is designed to be an ellipsoidal shape, compared to a spherically shaped mixing chamber 3, the ellipsoidal mixing chamber has a larger mixing volume, so that materials sprayed by the spray gun 5 can be sufficiently atomized within effective distance ranges, the atomized materials can be sufficiently contacted in a larger volume, and therefore, the mixing effect can be further improved.

Various atomized solutions are attached on the wall of the mixing chamber after being sufficiently contacted, to form droplets, the droplets flow downwards along the wall of the mixing chamber under gravity, flow out of the outlet at the bottom of the mixing chamber and flow into the receiver tray below the mixing chamber. Finally, the materials in the receiver tray are dewatered and dried to prepare final batch, and the final batch is then vulcanized to obtain a rubber product.

In a case of guaranteeing sufficient materials, gas supply device 6 supplies gas continuously to the spray gun 5, and the pressure is controlled to ensure that the materials sprayed by the spray gun are in an atomized state, in this way, sufficient mixing and then continuous spraying of the spray gun are guaranteed, and thereby continuous operation of the apparatus and continuous production can be achieved.

Step five: the rubber mixture obtained in Step S4 is flocculated, washed and dewatered, to obtain a rubber master batch.

The specific step includes: a certain amount of acetic acid is added into the stirred mixture solution, and then the latex mixture solution is uniformly flocculated. The solidified latex mixture is put into a rubber washing machine for dewatering, and rinsed with tap water at the same time, the rubber sheet dewatered by the rubber washing machine is put into a drying oven at a temperature of 70° C. to dry for 8 hours, the temperature of the drying oven is then adjusted to 148° C., the rubber sheet is baked again for 2 minutes, and then is taken out.

The obtained rubber master batch can be subjected to mixing and vulcanization in an open mill. Specific operations are as follows: the dried rubber sheet is put in the open mill for supplementary mixing, in a state in which the roller gap of the open mill is minimum, the rubber sheet can be batched out after ten times of rolling on the roller of the open mill, to obtain the final batch, the prepared compound is vulcanized for 15 minutes on a press vulcanizer at 150° C., under a pressure of 10 MPa, and then wet vulcanized rubber is obtained.

In conclusion, by adopting the above technical solutions, various raw materials in the formulation are prepared into a solution state, the solution is atomized uniformly by the spray gun, and diffusively mixed in the mixing chamber, thus achieving a wet mixing effect; the specific surface area for material contact is improved by the atomization, thereby improving the wet mixing effect; the apparatus provided in the present invention has advantages of simple structure, convenient installation, low equipment investment, little space taking, simple and convenient operation, low energy consumption, and continuous production. Meanwhile, the rubber wet mixing preparation method provided in the present invention has advantages that, the working environment is improved, the environmental pollution is reduced, the energy is saved, the processing technology is simple, and industrial production can be realized.

Though the exemplary implementations of the present invention have been described above, they are not intended to limit the present invention. Any modification, equivalent alternation, and improvement made within the spirit and principle of the present invention fall within the scope of the present invention.

What is claimed is:

1. A gas-assisted rubber wet mixing preparation apparatus, comprising a rack, wherein, a reactor is fixedly mounted below the rack, a mixing chamber in an ellipsoidal shape is provided inside the reactor; the reactor is provided with a plurality of feed ports, the feed ports are provided at an included angle with respect to horizontal plane; spray guns cooperating with the feed ports are fixedly mounted on an outer wall of the reactor, a material storage tank and a gas supply device are connected to each of the spray guns; each of the spray guns is corresponding to one material storage tank, and each of the spray guns is connected to the corresponding material storage tank respectively; a discharge port is further provided below the reactor, and a receiver tray is provided below the discharge port.

2. The gas-assisted rubber wet mixing preparation apparatus according to claim 1, wherein, a first flange is provided on a top of the rack; and the first flange is fixedly connected to the reactor.

3. The gas-assisted rubber wet mixing preparation apparatus according to claim 1, wherein, the reactor is fixedly provided with a plurality of second flanges at positions of the feed ports; and the second flange and a third flange provided on the spray gun are connected cooperatively.

4. The gas-assisted rubber wet mixing preparation apparatus according to claim 1, wherein, an opening direction of the feed port forms an included angle ranging from 30° to 60° with the horizontal plane.

5. The gas-assisted rubber wet mixing preparation apparatus according to claim 1, wherein, a material guide pipe is provided between the material storage tank and the spray gun.

6. The gas-assisted rubber wet mixing preparation apparatus according to claim 1, wherein, a gas guide pipe is provided between the gas supply device and the spray gun.

7. The gas-assisted rubber wet mixing preparation apparatus according to claim 1, wherein, the spray gun is further provided with a material regulating valve, a sector regulating valve and a solenoid valve.

8. The gas-assisted rubber wet mixing preparation apparatus according to claim 7, wherein, the spray gun is regulated at an angle ranging from 60° to 120° by the sector regulating valve.

* * * * *